United States Patent [19]

Imoto et al.

[11] Patent Number: 4,926,817
[45] Date of Patent: May 22, 1990

[54] COMBUSTION CHAMBER OF SUBCHAMBER TYPE INTERNAL COMBUSTION ENGINE

[75] Inventors: Koji Imoto; Tadao Omura; Yoichi Kataoka, all of Nagasaki; Kunihiko Nakajima, Muko; Motoyuki Maekawa, Kyoto; Hiroki Tamura, Okazaki; Yoshiaki Shioya, Kyoto, all of Japan

[73] Assignees: Mitsubishi Jukogyo Kabushiki Kaisha; Mitsubishi Jidosha Kogyo Kabushiki Kaisha, both of Tokyo, Japan

[21] Appl. No.: 290,191

[22] Filed: Dec. 27, 1988

[30] Foreign Application Priority Data

Dec. 24, 1987 [JP] Japan ................................ 62-325219

[51] Int. Cl.⁵ ......................... F02B 19/02; F02B 19/18
[52] U.S. Cl. ..................................... 123/292; 123/293
[58] Field of Search ................................ 123/292, 293

[56] References Cited

U.S. PATENT DOCUMENTS

3,919,985 11/1975 Yagi et al. ............................ 123/292
3,929,107 12/1975 Renger ............................ 123/292 X Primary Examiner—Tony M. Argenbright
Attorney, Agent, or Firm—Wenderoth, Lind & Ponack

[57] ABSTRACT

An improved combustion chamber of a subchamber type of internal combustion engine defines a space extending contiguously to a subchamber injection port within a subchamber mouthpiece. A subchamber injection port control rod is disposed in the space adjacent the injection port. Remote from the subchamber injection port is an actuator within the space. A working substance such as wax, rubber, alcohol, etc. that expands and contracts to a large degree when subjected to temperature changes is sealingly enclosed within the actuator by an expansible member made of rubber or the like. One end of the subchamber injection port control rod is inserted into the expansible member. During a light loading operating state of the engine, a tip end portion of the subchamber injection port control rod is positioned to lie substantially along the same plane as the passageway wall surface defining the subchamber injection port, while during a heavy loading operating state the control rod is projected into the subchamber injection port and reduces the cross-sectional area of the passageway.

12 Claims, 9 Drawing Sheets

4/4 LOAD

WITH STOPPER
WITHOUT STOPPER

LOW SPEED — HIGH SPEED
ROTATIONAL SPEED OF ENGINE

COMBUSTION CHAMBER OF SUBCHAMBER TYPE INTERNAL COMBUSTION ENGINE

BACKGROUND OF THE INVENTION

1. Field of the Invention:

The present invention relates to improvements in a combustion chamber of a subchamber type internal combustion engine.

Figure 12A:
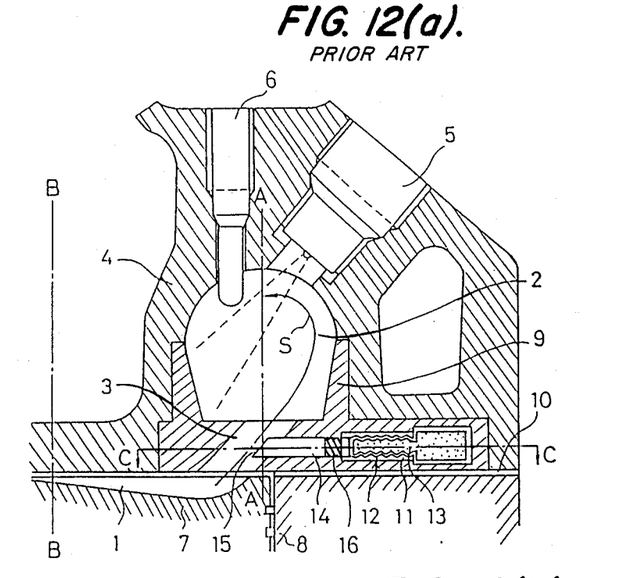
FIGS. 12(a) and 12(b) are, respectively, longitudinal and transverse cross-sectional views of a combustion chamber of a subchamber type of internal combustion engine in the prior art.
Figure 12B:
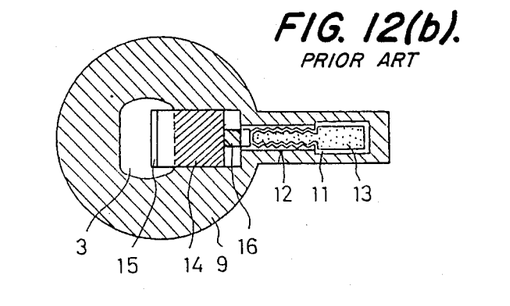

2. Description of the Prior Art:

At first, a known combustion chamber of a subchamber type of internal combustion engine in the prior art will be described with reference to FIG. 12. In this figure, a subchamber 2 is provided within a hollow cylinder head 4. The subchamber 2 is defined by an upper portion having a hemispherical shape and a lower portion having a frusto-conical shape or a cylindrical shape or the like. FIG. 12 shows the known subchamber defined by a lower portion having a frusto-conical shape. In the subchamber 2 are disposed a fuel injection valve 5 and, if necessary, a glow plug 6 for preheating the interior of the subchamber 2 upon the starting-up of the engine. The subchamber 2 communicates, via a subchamber injection port 3, with a main chamber 1 defined by the top surface of a piston 7, a cylinder 8 and the lower surface of the cylinder head 4.

Located along a cross-sectional plane of the subchamber injection port passageway passing through a subchamber center axis A—A and a cylinder center axis B—B, and extending within a subchamber mouthpiece 9 on the side of the subchamber injection port passageway wall located away from the cylinder center axis B—B, is defined a space 11 adjacent the subchamber injection port 3 and open to the subchamber injection port passageway. Within the space 11 are disposed a subchamber injection port control rod 14 and an expansible tube 12 connected with each other. Within the expansible tube 12 is sealingly enclosed a working substance (solid such as wax or the like, liquid or mixture of solid and liquid) that is subject to large amounts of expansion and contraction according to a temperature change thereof. A tip end portion 15 of the subchamber injection port control rod 14 lies nearly along the same plane as the subchamber injection port passageway wall surface or projects into the subchamber injection port 3. More particularly, the working substance such as wax or the like sealingly enclosed within the expansible tube 12 expands or contracts according to the temperature of the subchamber mouthpiece 9 and the temperature within the space 11. Accordingly, the length of the expansible tube 12 changes. Thus, the expansible tube 12 is a mechanism for controlling the cross-sectional area of the subchamber injection port passageway by actuating the subchamber injection port control rod 14 having the tip end portion 15. FIG. 12 shows the case where the control rod tip end portion 15 projects into the subchamber injection port 3 during a heavy loading operating state when the subchamber mouthpiece temperature and the temperature within the space 11 are high.

Next, the function of the above-described combustion chamber will be described.

Upon start-up or during a light loading operating state when the combustion chamber temperature is low and hence a subchamber mouthpiece temperature or the temperature within the above-mentioned space 11 is low, the tip end portion 15 of the subchamber injection port control rod 14 lies substantially along the same plane as the subchamber injection port passageway wall surface, and the cross-sectional area of the subchamber injection port passageway area is at a maximum. Accordingly, upon a compression stroke, the speed of the inflow of the gas within the main chamber 1 into the subchamber 2 created by compression of the gas within the main chamber 1 by means of the piston 7, and hence the speed of the swirl flow within the subchamber is small, and cooling of the fuel and thermal loss caused by the flow of gas is reduced. In addition, during a light loading operating state, since an injection amount of fuel is also small, the formation of a mixture of fuel and air within the subchamber as well as the combustion of the same can be insured. Also, upon an expansion stroke, the outflow of gas from the subchamber 2 into the main chamber 1 is facilitated since the cross-sectional area of the subchamber injection port passageway is large, and choking loss at the subchamber injection port is reduced. Furthermore, since the injection flow speed within the main chamber 1 is also small, thermal loss is also reduced.

As the load of the engine becomes high, the combustion chamber wall temperature, and hence the subchamber mouthpiece temperature and the temperature within the above-mentioned space, rises. And, since the working substance such as wax or the like within the expansible tube 12 expands, the length of the expansible tube 12 increases. Accordingly, the tip end portion 15 of the subchamber injection port control rod 14 connected to the expansible tube 12 projects into the subchamber injection port 3 and the cross-sectional area of the subchamber injection port passageway is reduced. In this case, as the load becomes higher, the amount that the tip end portion 15 projects into the subchamber injection port 3 becomes larger, and the cross-sectional area of the subchamber injection port passageway is further reduced. Consequently, as the load on the engine becomes greater, a jet flow speed from the main chamber 1 to the subchamber 2 during the compression stroke and hence a swirl flow speed within the subchamber 2 become high, resulting in the promotion of the mixing of fuel and air as well as the combustion of the mixture.

In addition, the jet flow speed to the main chamber 1 during the expansion stroke also becomes high. Hence, the mixing of the fuel and unburnt fuel within the main chamber 1 is promoted, and the combustion is improved.

However, in the above-described combustion chamber in the prior art in which a cross-sectional area of a subchamber injection port passageway is controlled by means of the expansible tube 12, the degree to which the stroke of the expansible tube is variable is small. If it is therefore contemplated to enlarge the degree to which the stroke is variable, the expansible tube 12 becomes very large and, due to the structure of the cylinder head, it becomes difficult to transfer to the expansible tube 12 a quantity of heat that is necessary to expand and contract wax as a result of the enlargement of the expansible tube 12.

In order to enlarge the stroke of the expansible tube 12, a number of turns of a screw-like part of the expansible portion (bellows) of the expansible tube 12 must be increased. Unless the diameter of the expansible portion is simultaneously enlarged, the value of the length of expansible portion/diameter of expansible portion becomes large and buckling would occur. Or else, if the degree to which the stroke of the expansible tube 12 is varied is increased by providing a relatively fewer number of turns of the screw-like portion and an increased pitch of the screw-like portion, then the expansible tube 12 must be large and fabricating the cylinder head becomes difficult.

SUMMARY OF THE INVENTION

It is therefore one object of the present invention to provide an improved combustion chamber of a subchamber type of internal combustion engine that is free from the above-mentioned shortcomings in the prior art.

A more specific object of the present invention is to provide an improved combustion chamber of a subchamber type of internal combustion engine in which a cross-sectional area of the subchamber injection port passageway can be varied over a wide range and yet the cylinder head can be relatively small.

Another object of the present invention is to provide an improved combustion chamber of a subchamber type of internal combustion engine, which contributes to improved fuel consumption and starting characteristics of the engine upon partial loading, i.e. improved combustion characteristics which contributes to improved fuel economy and smoking characteristics during a heavy loading operating state, which is compact so as to facilitate the fabrication of the cylinder head, and which can widely change the cross-sectional area of the subchamber injection port passageway.

According to the present invention, there is provided a combustion chamber of a subchamber type of internal combustion engine comprising a space provided contiguously to a subchamber injection port within a subchamber mouthpiece, said space being open at a passageway wall of the subchamber injection port, a subchamber injection port control rod fitted in the space adjacent the injection port, and an actuator contained within the space opposite the subchamber injection port, said actuator having a working substance such as wax, rubber, alcohol, etc. that expands and contracts to a large degree when subjected to temperature changes and is sealingly enclosed within an expansible member of the actuator made of rubber or the like, one end of the subchamber injection port control rod being insertable into the expansible member. During a light loading operating state of the engine, a tip end portion of the subchamber injection port control rod is positioned substantially along the passageway wall surface of the subchamber injection port, while during a heavy loading operating state it projects into the subchamber injection port and reduces the cross-sectional area of the passageway.

According to the present invention, upon partial loading or upon start-up when the temperature of the combustion chamber is low and hence the wall temperature of the subchamber mouthpiece is low, the cross-sectional area of the passageway of the subchamber injection port is large and so the jet flow speed and the swirl flow speed within the main and sub-combustion chambers are suppressed. However, as the load on the engine increases, the wall temperature of the combustion chamber (the subchamber mouthpiece) becomes high. Hence, due to the expansion of the above-described working substance, the subchamber injection port control rod projects into the subchamber injection port and reduces the cross-sectional area of the passageway of the subchamber injection port. Therefore, the jet flow speed and swirl flow speed within the combustion chamber increases.

In the combustion chamber of the subchamber type of internal combustion engine according to the present invention which can operate in the above-described manner, upon start-up or during a partial load operating state when the wall temperature of the combustion chamber and hence the temperature of the working substance such as wax or the like within the actuator is low, since the cross-sectional area of the passageway of the subchamber injection port is comparatively large, a thermal loss as well as a choking loss of the subchamber injection port can be reduced. However, as the loading state approaches a heavy loading state, the wall temperature of the combustion chamber and hence the temperature of the working substance such as wax or the like rises resulting in the expansion of the working substance. Therefore, the subchamber injection port control rod is pushed towards the subchamber injection port, and the tip end portion of the subchamber injection port control rod is projected into the subchamber injection port and reduces the cross-sectional area of the subchamber injection port passageway so that gas flow speeds in the main chamber and the subchamber are increased. Thus, the formation of a fuel-air mixture and the combustion thereof can be promoted.

If the combustion chamber according to the present invention is employed, since the variable means, i.e. the actuator, is compact and the amount of displacement of the subchamber injection port control rod can be made large, the fuel consumption rate and a smoke density can be reduced over the entire loading region from a light loading region to a heavy loading region. Also a reduction of $NO_x$ upon partial loading, a reduction in noise, and improvements in starting characteristics and acceleration of an engine can be realized.

The above-mentioned and other objects, features and advantages of the present invention will become more apparent by referring to the following description of preferred embodiments of the invention taken in conjunction with the accompanying drawings.

DETAILED DESCRIPTION OF THE PREFERRED EMBODIMENTS

A first preferred embodiment of the present invention will be described with reference to FIGS. 1 to 3. Among these figures, FIG. 1(a) is a longitudinal cross-sectional view of an essential part of the combustion chamber wherein the subchamber injection port control rod projects into the subchamber injection port at a high temperature, and FIG. 1(b) is a transverse cross-sectional view taken along line C—C in FIG. 1(a).

The subchamber 2 is defined within a hollow cylinder head 4. The subchamber 2 is defined by an upper portion having a hemispherical shape and a lower portion having a frusto-conical shape or a cylindrical shape or the like. FIG. 1 shows the known subchamber defined by a lower portion having a frusto-conical shape. In the subchamber 2 are disposed a fuel injection valve 5 and, if necessary, a glow plug 6 for preheating the interior of the subchamber 2 upon the start of the engine. The subchamber 2 communicates, via a subchamber injection port 3, with a main chamber 1 defined by the top surface of a piston 7, a cylinder 8 and the lower surface of a cylinder head 4.

Located along a cross-sectional plane of the subchamber injection port passageway passing through a subchamber center axis A—A and a cylinder center axis B—B, and extending within a subchamber mouthpiece 9 on the side of the subchamber injection port passageway wall located away from the cylinder center axis B—B, is defined a space 11 adjacent to the subchamber injection port 3 and open to the subchamber injection port passageway. Within the space 11 are disposed a subchamber injection port control rod 14 and an actuator 12. Within the actuator 12 is a substance 13 (solid, liquid, or mixture of solid and liquid) that expands and contracts to a large degree when subject to temperature changes, such as wax, rubber, alcohol, etc. The substance 13 is sealed within actuator 12 by means of an expansible member 20 made of rubber or the like. One end of the subchamber injection port control rod 14 is inserted into the expansible member 20. A tip end portion 15 of the subchamber injection port control rod 14 lies substantially along the same plane as the subchamber injection port passageway wall surface, or projects into the subchamber injection port 3. More particularly, the working substance such as wax, rubber, alcohol, etc. sealingly enclosed within the actuator 12, expands or contracts according to the temperature of the subchamber mouthpiece 9 and the temperature within the space 11. Accordingly, the actuator 12 is a mechanism for controlling the cross-sectional area of the subchamber injection port passageway due to the actuation of the subchamber injection port control rod 14 and the corresponding movement of the tip end portion 15 thereof.

Figure 1A:
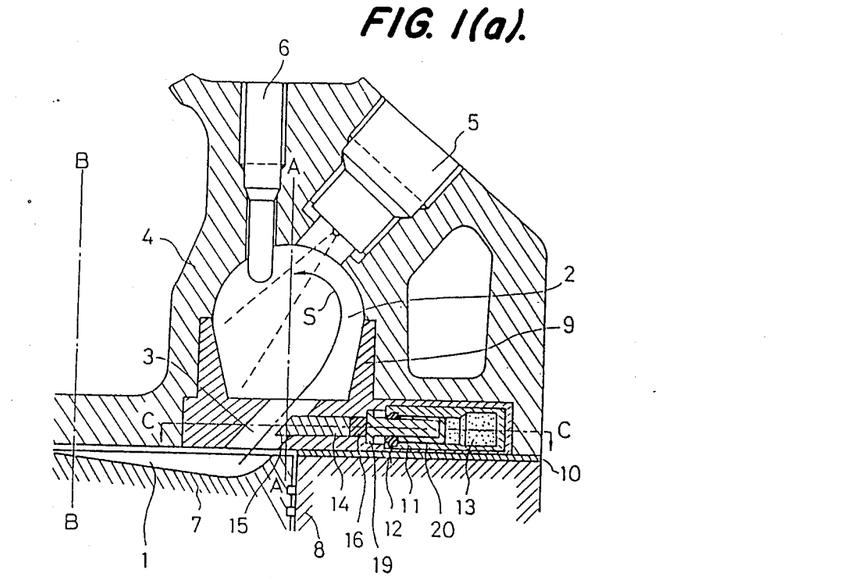
FIG. 1(a), (b) and FIG. 2(a), (b) each show both longitudinal and transverse cross-sectional views of an essential part of a combustion chamber according to a first preferred embodiment of the present invention but under different loading conditions, respectively.
Figure 1B:
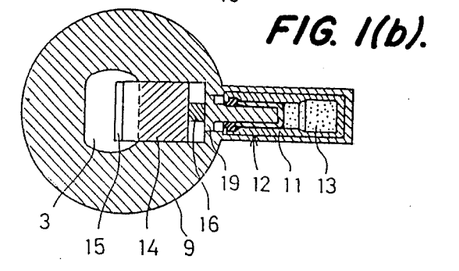
Figure 2A:
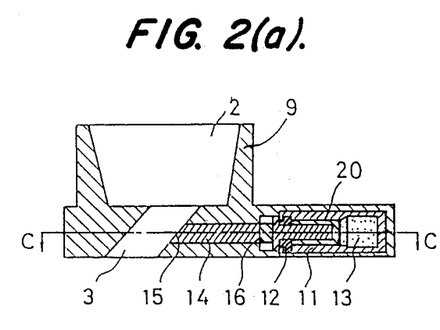
Figure 2B:
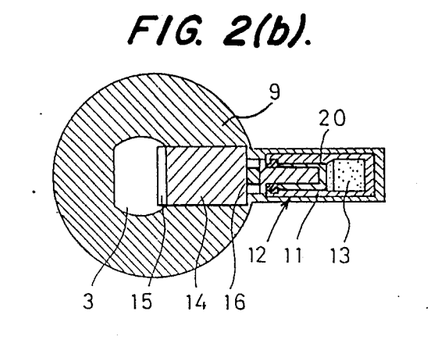

FIGS. 2(a) and 2(b) illustrate the state in which the tip end portion 15 of the subchamber injection port control rod lies substantially along the same plane as the subchamber injection port wall surface upon the starting or during a light loading operating state of the engine when the temperature of the subchamber mouthpiece 9 and the temperature within the space 11 are low, while FIGS. 1(a) and (b) illustrate the state in which the tip end portion 15 of the same control rod projects into the subchamber injection port 3 during a heavy loading operating state when the temperature of the subchamber mouthpiece 9 and the temperature within the space 11 are high. If necessary, insulating material 16 can be used as one part of the subchamber injection port control rod 14.

Next, the operation and advantages of the above-described first preferred embodiment will be described.

According to the present invention, upon start-up or during the light loading operation state when the wall temperature of the combustion chamber, and hence the temperature of the subchamber mouthpiece 9 and the temperature within the space 11 are low, the tip end portion 15 of the subchamber injection port control rod lies substantially along the same plane as the wall surface of the subchamber injection port passageway. Thus, the cross-sectional area of the subchamber injection port passageway is large. Accordingly, upon a compression stroke, the speed at which the gas within the main chamber 1 flows into the subchamber 2 due to compression of the gas within the main chamber 1 caused by the piston 7, and hence a swirl flow speed within the subchamber 2 is low, and the cooling of fuel and the thermal loss caused by the gas flow is reduced. In addition, during a light loading operating state, since the amount of fuel injected is small, the formation and combustion of a fuel-air mixture within the subchamber 2 can be insured. Furthermore, upon an expansion stroke, the outflow of gas from the subchamber 2 to the main chamber 1 is facilitated due to the large cross-sectional area of the subchamber injection port passageway, and a choking loss at the subchamber injection port is reduced. Still further, since a jet flow speed within the main chamber 1 is small, thermal loss is also reduced.

As the load on the engine is increased, the wall temperature of the combustion chamber and hence the temperature within space 11 rises, and since the working substance 13 such as wax or the like within the actuator 12 expands, the member 20 and the subchamber injection port control rod 14 are pushed towards the subchamber injection port 3. Accordingly, the tip end portion 15 of the subchamber injection port control rod 14 projects into the subchamber injection port 3, and the cross-sectional area of the subchamber injection port passageway becomes small. The greater the load, the more the tip end portion 15 projects into the subchamber injection port 3, and the more the cross-sectional area of the subchamber injection port is reduced. Consequently, the larger the load on the engine, the greater the jet flow speed from the main chamber 1 to the subchamber 2 during the compression stroke and, accordingly, the greater the swirl flow speed within the subchamber 2. Thus, the mixing of fuel and air and the combustion thereof is promoted. In addition, during the expansion stroke, the jet flow speed within the main chamber 1 also becomes great. Hence, the mixing of the unburnt fuel and air within the main chamber 1 is promoted and thus, combustion is improved. On the contrary, if the load on the engine is low, the wall temperature of the combustion chamber, and thus the temperature of the subchamber mouthpiece and the temperature within the space 11 become low. And, due to the fact that the working substance 13 such as wax or the like within the actuator 12 contracts, a cavity is produced within the actuator 12. Hence, the subchamber injection port control rod 14 is pushed towards the actuator 12 by the gas pressure within the cylinder, the cross-sectional area of the subchamber injection port passageway is increased, and, as described previously, thermal loss and choking loss at the subchamber injection port are reduced.

Figures 3A, 3B, 3C, 3D:
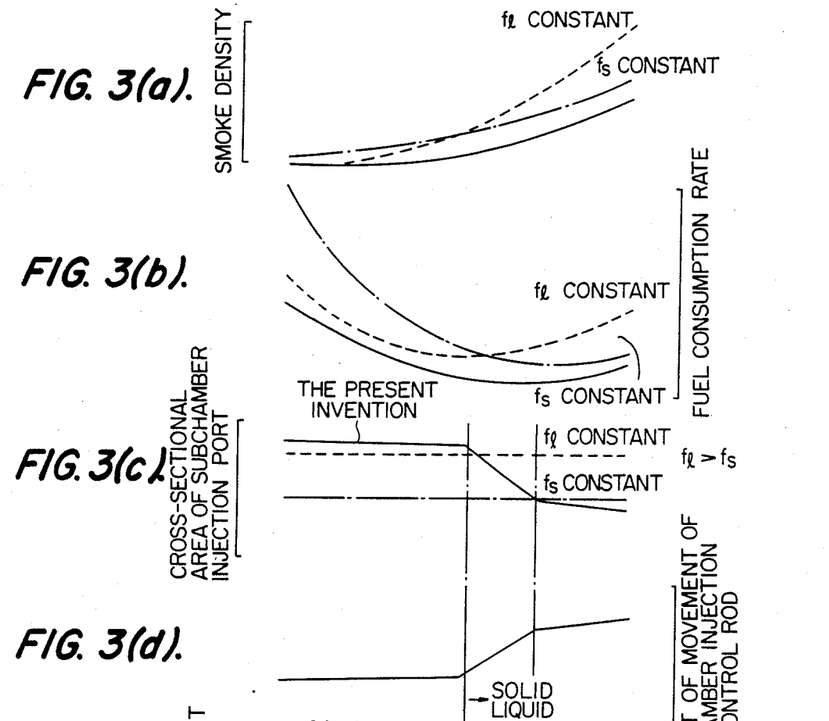
FIGS. 3(a)-(e) are graphs illustrating the operational characteristics and advantages of the combustion chamber according to the first preferred embodiment.
Figure 3E:
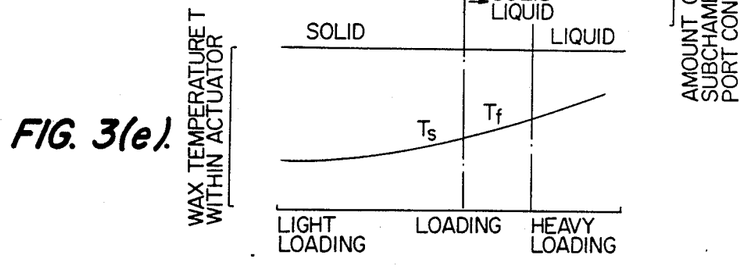

One example of the effects and advantages obtained in the case where wax is employed as the working substance within the actuator 12 is shown in FIG. 3. As shown in FIG. 3(e), when the wax temperature T is low ($T < T_s$), the wax assumes a solid state whose coefficient of thermal expansion is very small, but after the wax temperature has reached a certain temperature T ($T_s \leq T \leq T_f$), the wax experiences a phase-transformation from solid to liquid. During this phase-transformation the coefficient of thermal expansion becomes very large, and when the wax temperature T has become $T > T_f$ and the wax has completely become liquid, the coefficient of thermal expansion again becomes small. In most of the other substances, while the coefficient of thermal expansion increases gradually as the temperature rises, the coefficient of thermal expansion does not change to a large degree in accordance with a phase-transformation therein as is the case with wax. Accordingly, if wax is used as the working substance within the actuator 12, until the loading increases to a certain extent (wax temperature $T < T_s$) the wax assumes a solid state. And, since the coefficient of thermal expansion is very small, the subchamber injection port control rod 14 is displaced only a little, and the cross-sectional area of the subchamber injection port remains comparatively large. As the load on the engine increases, the wax temperature T becomes $T_s \leq T \leq T_f$ and the wax experiences a phase-transformation from solid to liquid. And, since the coefficient of thermal expansion of the wax becomes very large, the volume of wax increases. Hence, the subchamber injection port control rod 14 is pushed out towards the subchamber injection port 3 thereby choking the subchamber injection port passageway. If the load on the engine is further increased and the wax temperature T becomes $T > T_f$, then the wax assumes a completely liquid state. Since the coefficient of thermal expansion becomes small, the volume of the wax increases only a little and, consequently, a variation in the cross-sectional area of the subchamber injection port passageway occurs only to a little extent, and the injection port remains choked.

On the contrary, if the load on the engine becomes low, the temperature of the wax is lowered. And, since the wax contracts, a cavity is produced within the actuator, and the cross-sectional area of the subchamber injection port passageway is enlarged by the gas pressure within the cylinder. In this respect, the force generated upon the expansion and contraction of wax can be made larger than the gas pressure in the cylinder and the frictional force acting upon the subchamber injection port control rod 14, so that a smooth operation of the subchamber injection port control rod 14 or the like is possible. FIG. 3(d) illustrates the amount of movement of the tip end portion of the subchamber injection port control rod.

FIGS. 3(a), 3(b), and 3(c) are, respectively, graphs illustrating smoke density, rate of fuel consumption and cross-sectional area of the subchamber injection port in the combustion chamber of the prior art [the variable mechanism 11-14 for the subchamber injection port being removed from the combustion chamber according to the present invention]. If the cross-sectional area of the subchamber injection port is enlarged (fl constant), then in the light loading region choking loss at the subchamber injection port is reduced, and the rate of fuel consumption and smoke density characteristics are relatively excellent. However, in the heavy loading region, the jet flow speed of fuel passing into the subchamber 2 and, accordingly, the swirl flow speed in the subchamber 2 and the jet flow speed of fuel within the main chamber 1 are low. Hence, the mixing of fuel and air within the main and sub-combustion chambers and the combustion of the mixture is not promoted. Thus, the fuel economy as well as the smoke density characteristics are degraded. On the other hand, if the cross-sectional area of the subchamber injection port is reduced ($f_s < fl$), then in the heavy loading region combustion is promoted and the rate of fuel consumption and smoke density characteristics are relatively excellent. However, in the light loading region thermal loss as well as a subchamber injection port loss increase and hence, fuel economy as well as smoke concentration characteristics are degraded. In the combustion chamber according to the present invention as described above, the cross-sectional area of the subchamber injection port can be varied depending upon the load on the engine. More particularly, in the light loading region of the engine, since the cross-sectional area f of the subchamber injection port passageway can be enlarged ($f \geq fl$), thermal loss of the combustion chamber and a choking loss at the subchamber injection port are reduced, and the rate of fuel consumption as well as smoke density can be decreased. If the load becomes high, since the cross-sectional area f of the subchamber injection port is made small ($f \leq f_s$), the mixing of fuel and air in the main chamber and the subchamber as well as the combustion of the mixture are promoted. Thus, the rate of fuel consumption and the smoke density can be reduced. Accordingly, fuel consumption and smoke density characteristics can be improved over the entire region of loading from the light loading region to the heavy loading region.

Figure 4:
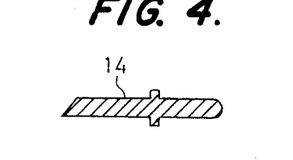
FIG. 4 is a cross-sectional view of a control rod of a second preferred embodiment of the present invention.

FIG. 4 shows a second preferred embodiment of the present invention in which the entire subchamber injection port control rod 14 is formed of an insulating material. While the operation and advantages associated with this modification are nearly similar to those in the above-described first preferred embodiment in which only a part of the control rod 14 is formed of an insulating material 16, the heat transfer through the subchamber injection port control rod 14 of the second preferred embodiment is even. Thus, an excessive temperature rise in the working substance 13 and the member 20 within the actuator 12 is further prevented.

Figure 5:
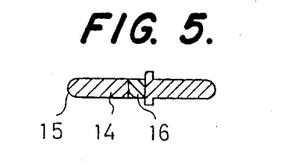
FIG. 5 is a similar cross-sectional view of a control rod of a third preferred embodiment of the present invention.

FIG. 5 shows a third preferred embodiment of the present invention in which the tip end portion of the subchamber injection port control rod 14 has a semi-cylindrical shape or a round corner portion. While the operation and advantages associated with this modification are nearly similar to those in the first preferred embodiment, a smoother flow within the subchamber injection port 3 can be realized, and the tip end portion 15 of the control rod 14 of the third preferred embodiment is more durable. A similar modification of the control rod 14 according to the second preferred embodiment can be made.

Figure 6:
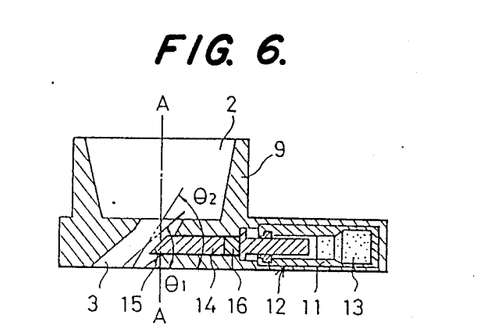
FIG. 6 is a cross-sectional view of an essential part of a combustion chamber according to a fourth preferred embodiment of the present invention.

FIG. 6 shows a fourth preferred embodiment of the present invention. In the first preferred embodiment an inclination angle $\Theta$ of the axis of the subchamber injection port 3 is constant. According to this preferred embodiment, an outflow angle of the axis of the subchamber injection port at the subchamber side is represented by $\Theta_2$ with respect to a plane extending perpendicular to the center axis A—A of the subchamber, an outflow angle of the axis of the aforementioned subchamber injection port at the main combustion chamber side is represented by $\Theta_1$ with respect to the plane extending perpendicular to the center axis A—A of the aforementioned subchamber, and the relation $\Theta_1 < \Theta_2$ exists so that the axis of the subchamber injection port 3 can be defined by a combination of straight lines and a circular arc.

While the operation and advantages associated with this preferred embodiment are nearly similar to those in the first preferred embodiment, since the outflow angle $\Theta_2$ of the axis of the subchamber injection port on the side of the subsidiary combustion chamber is large ($\Theta_2 > \Theta_1$), during the expansion stroke the outflow of gas from the subchamber 2 to the main chamber 1 is facilitated (the flow coefficient of the subchamber injection port being large), and choking loss at the subchamber injection port is further reduced. In addition, since the aforementioned outflow angle $\Theta_1$ is small ($\Theta_1 < \Theta_2$), a jet flow penetration within the main chamber 1 becomes large, the mixing of unburnt fuel and air as well as the combustion of the mixture are promoted, and fuel economy and smoke density characteristics are improved. The same occurs when this modification is employed in the second and third preferred embodiments.

Figure 7A:
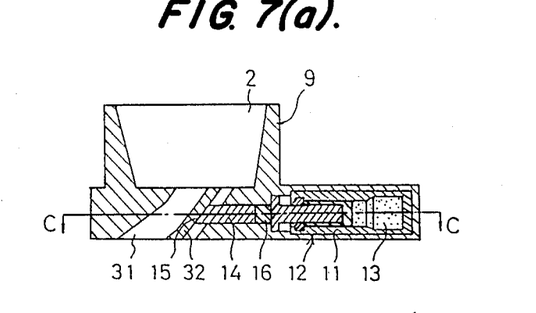
FIGS. 7(a) and 7(b) are, respectively, longitudinal and transverse cross-sectional views of an essential part of a combustion chamber according to a fifth preferred embodiment of the present invention.
Figure 7B:
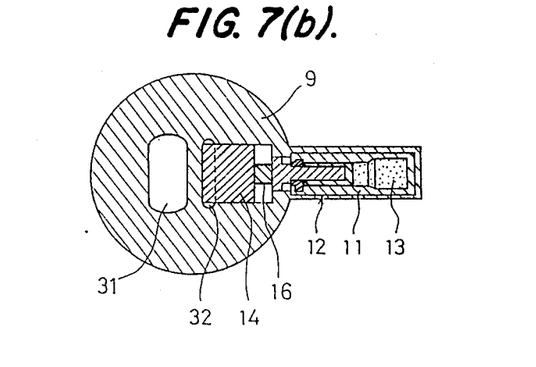

FIG. 7 shows a fifth preferred embodiment of the present invention, in which the subchamber injection port of the first or fourth preferred embodiments shown in FIGS. 1 and 6, respectively, is divided into a plurality of ports. FIG. 7 shows an embodiment having two injection ports including a subsidiary injection port 32 disposed on the side remote from the center axis B—B of the cylinder. In the cross-sectional plane of the subsidiary injection port 32 passing through the subchamber center axis A—A and the cylinder center axis B—B, is defined a space 11 open to the aforementioned subsidiary injection port 32 and extending within the subchamber mouthpiece 9 on the side of the subsidiary injection port passageway remote from the cylinder center line B—B. An actuator 12 having a subchamber injection port control rod 14 and wax or the like sealingly enclosed therein is disposed in space 11 to regulate the cross-sectional area of the subsidiary injection port 32. In addition, if the outflow angle of the axis of the main injection port 31 at the subchamber side is represented by $\Theta_{21}$ and that of the subsidiary injection port 32 by $\Theta_{22}$ with respect to a plane perpendicular to the subchamber center axis A—A, and the outflow angle of the axis of the main injection port 31 at the main chamber side is represented by $\Theta_{11}$ and that of the subsidiary injection port 32 by $\Theta_{12}$ relationships of $\Theta_{11} \leq \Theta_{21}$ and $\Theta_{12} \leq \Theta_{22}$ exist. And, the axes of the above-mentioned subchamber injection ports can be defined by a combination of straight lines and a circular arc, or by a straight line.

While the operation and advantages associated with the above-described embodiment are nearly similar to those of the first or fourth preferred embodiments, since the subchamber injection port control rod 14 only enters the subsidiary injection port 32 to control only the cross-sectional area of the subsidiary injection port passageway, the flow in the main injection port 31 is not disturbed. Accordingly, the mixing of fuel and air and the combustion of the mixture in the main and subsidiary combustion chambers are further improved.

The same modification can also be applied to the second and third preferred embodiments.

Figure 8:
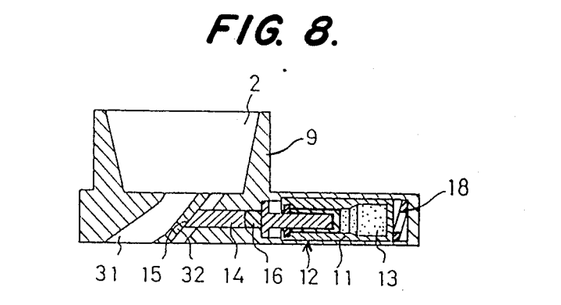
FIGS. 8 and 9 are cross-sectional views of an essential part of a combustion chamber according to a sixth preferred embodiment of the present invention under two different loading conditions, respectively.
Figure 9:
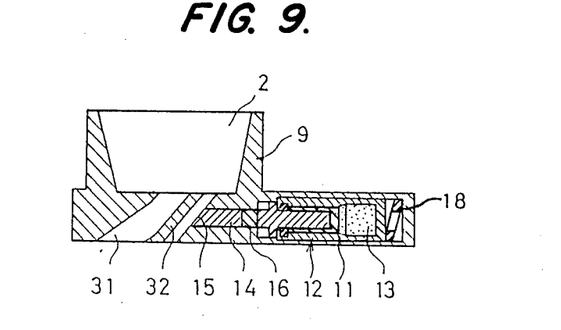

FIGS. 8 and 9 show a sixth preferred embodiment of the present invention in which in the space 11 within the subchamber mouthpiece 9 of the fifth preferred embodiment, an expansible member 18 such as a spring washer or a spring is disposed at the end surface of the actuator 12 on the side opposite to the subchamber injection port control rod 14. The expansible member 18 contacts the end surface of the actuator 12 and the side walls defining the space 11.

The operation and advantages associated with this preferred embodiment are nearly similar to those in the fifth preferred embodiment. In the fifth preferred embodiment, after the tip end portion 15 of the subchamber injection port control rod 14 has come into contact with the partition wall located between the subsidiary injection port 32 and the main injection port 31 due to a rise in temperature of the working substance such as wax or the like, if the temperature of the working substance such as wax or the like should further rise and the working substance expands, then a large force would by generated between the tip end portion 15 of the subchamber injection port control rod and the above-mentioned partition wall resulting in damage. According to the sixth preferred embodiment, due to the provision of the expansible member 18 such damage can be prevented. This is because the displacement of the subchamber injection port control rod 14 can be absorbed by the expansible member 18.

For instance, if the tip end portion 15 of the subchamber injection port control rod 14 is set to contact the above-mentioned partition wall during a low speed heavy loading operating state, then upon a high speed heavy loading operating state, the wall temperature of the combustion chamber, and accordingly the temperature of the working substance such as wax or the like would rise further and the above-mentioned situation would occur. In addition, if the above-mentioned preferred embodiment is employed, the setting of the actuator 12 within the subchamber mouthpiece 9 is easy. Also, damage to the subchamber injection port control rod 14 in the actuator 12 and the subchamber mouthpiece 9 can be prevented.

The above-described features can be employed in the second and third preferred embodiments as well.

Figure 10:
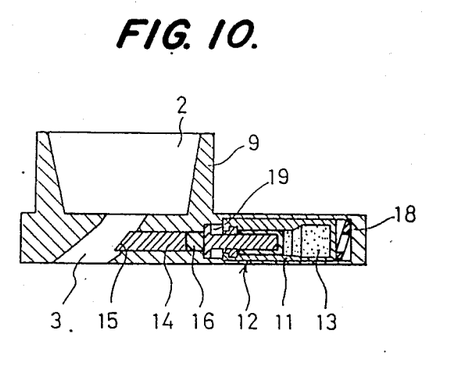
FIG. 10 is a cross-sectional view of an essential part of a combustion chamber according to a seventh preferred embodiment and an eighth preferred embodiment of the present invention.
Figure 11A:
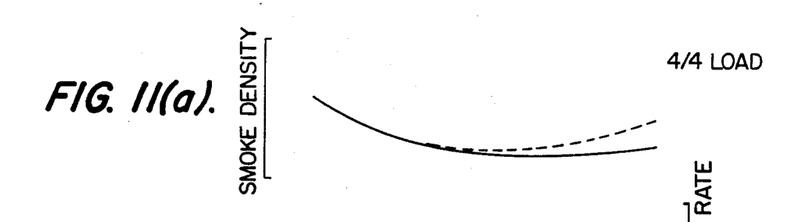
FIGS. 11(a)–(e) are graphs showing the operational characteristics and advantages of the combustion chamber according to the present invention, particularly those associated with the eighth preferred embodiment.
Figures 11B, 11C:
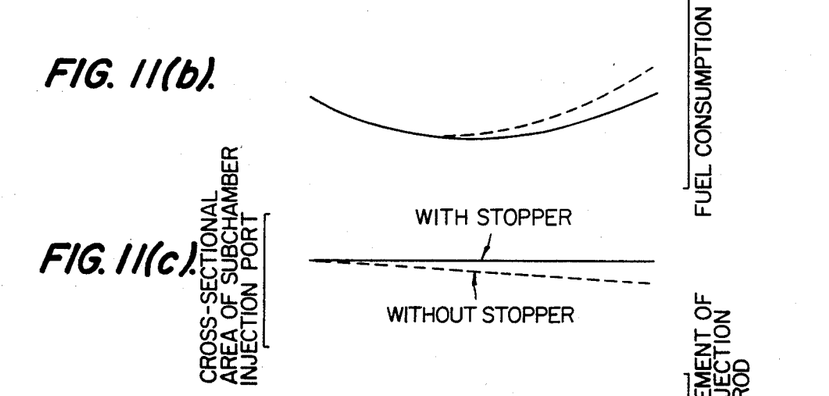
Figure 11D:
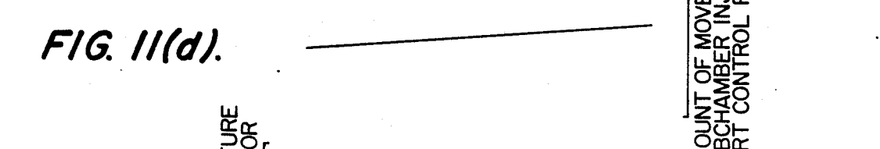
Figure 11E:
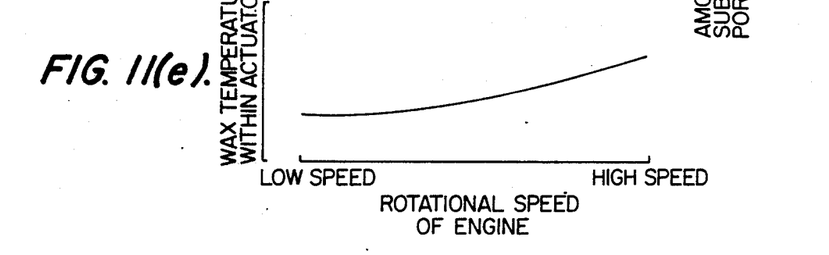

FIG. 10 shows a seventh preferred embodiment of the present invention in which in the space 11 within the subchamber mouthpiece 9 of the first or fourth preferred embodiments (the number of subchamber injection ports being one), at the end surface of the actuator 12 on the side opposite to the subchamber injection port control rod 14 is disposed an expansible member 18 such as a spring washer or a spring. The expansible member 18 contacts the end surface of the actuator 12 and the side walls defining the space 11.

While the operation and advantages associated with the above-mentioned seventh preferred embodiment are nearly similar to those of the first and fourth preferred embodiments, the setting of the actuator 12 within the subchamber mouthpiece 9 is easy, and the damaging of the actuating 12, the subchamber injection port control rod 14 and the subchamber mouthpiece 9 can be prevented.

The same feature can also be applied to the second and third preferred embodiments.

In the eighth preferred embodiment of the present invention also shown in FIG. 10, the expansible member 18 is omitted and a stopper 19 for limiting the maximum amount of projection of the control rod 14 into the subchamber injection port 3 is provided on the control rod 14.

While the operation and advantages associated with the eighth preferred embodiment are nearly similar to those in the preceding preferred embodiment, due to the provision of the stopper 19, even if the temperature of the working substance such as wax or the like should rise and the volume of the working substance should increase, the cross-sectional area of the subchamber injection port will not vary. Now the advantages associated with this embodiment will be described with reference to FIG. 11. If a rotational speed of an engine should rise under the 4/4 loading condition, the wall temperature of the combustion chamber, and hence the temperature of the subchamber mouthpiece 9 and the temperature within the space 11 would rise. Accordingly, the temperature of the wax within the actuator 12 would rise, and the wax would expand. When the stopper 19 is not provided, as the rotational speed of the engine rises, the cross-sectional area of the subchamber injection port passageway decreases. And, in the high speed rotation range, the subchamber injection port is excessively choked. On the other hand, if the stopper 19 according to the eighth preferred embodiment or the expansible member 18 according to the seventh preferred embodiment is provided, since the cross-sectional area of the subchamber injection port passageway does not vary beyond a certain minimum value, thermal loss and choking loss at the subchamber injection port are reduced, and fuel economy as well as smoke density characteristics can be improved.

As described in detail above, in the combustion chamber of the subchamber type internal combustion engine according to the present invention, upon the start-up or during a partial loading operating state when the wall temperature of the combustion chamber and hence the temperature of the working substance such as wax or the like within the actuator is low, since the cross-sectional area of the passageway of the subchamber injection port is large, thermal loss as well as choking loss at the subchamber injection port can be reduced. However, as the loading condition increases toward a heavy loading operating state, the wall temperature of the combustion chamber and hence the temperature of the working substance such as wax or the like rises resulting in the expansion of the working substance. Therefore, the subchamber injection port control rod 14 is pushed towards the subchamber injection port, and the tip end portion 15 of the subchamber injection port control rod 14 is projected into the subchamber injection port 3 and reduces the cross-sectional area of the subchamber injection port passageway so that gas flow speeds in the main chamber and the subchamber are increased. Thus, the formation of a fuel-air mixture gas and the combustion thereof are promoted.

In this way, according to the present invention, since the variable means, that is, the actuator 12 is compact and the amount of displacement of the subchamber injection port control rod 14 is large, the rate of fuel consumption and smoke density can be reduced over the entire loading region from a light loading region to a heavy loading region. Also, a reduction in $NO_x$ during a partial loading operating state and in noise, and improvements in starting characteristics and the acceleration of an engine can be realized.

While a principle of the present invention has been described above in connection with a number of preferred embodiments of the invention, it is a matter of course that many apparently widely different embodiments of the present invention could be made without departing from the spirit of the present invention.

What is claimed is:

1. In a fuel-injected combustion engine having a cylinder head in which a subchamber is defined, fuel injection means for injecting fuel into said subchamber, and a main combustion chamber, the improvement comprising a mouthpiece having an inner peripheral surface defining a subchamber injection port open to the subchamber and to the combustion chamber, and the mouthpiece having a space defined therein open to said peripheral surface; a subchamber injection port control rod disposed in said space adjacent said subchamber injection port; and an actuator disposed in said space remote from said subchamber injection port with said subchamber injection port control rod interposed therebetween, said actuator operatively engaging said subchamber injection port control rod for positioning one end of said control rod at the location at which said space is open to said inner peripheral surface when the engine is subjected to a light load and for projecting said control rod into said subchamber injection port passageway to reduce the cross-sectional area thereof when the engine is subjected to a heavy load that is greater than said light load, said actuator comprising a working substance such as wax or rubber or alcohol that expands and contracts to a significant degree when subjected to temperature changes, and an expansible member comprising an expansible material such as rubber sealing said working substance within said actuator and conformed to receive the other end of said control rod, said other end of said control rod extending in and engaged by said expansible member.

2. The improvement in a fuel-injected combustion engine as claimed in claim 1, wherein said one end of said control rod has a rounded outer peripheral surface.

3. The improvement in a fuel-injected combustion engine as claimed in claim 1, further comprising a resilient member engaging said actuator at an end thereof opposite said subchamber injection port control rod.

4. The improvement in a fuel-injected combustion engine as claimed in claim 1, wherein the subchamber injection port defined by said mouthpiece includes a plurality of separated ports open to the subchamber and the combustion chamber, one of said plurality of ports being located further away from a cylinder axis passing through the center of a cylinder disposed in the main combustion chamber than the other of said plurality of ports, and said space being open to said one of said plurality of ports.

5. The improvement in a fuel-injected combustion engine as claimed in claim 2, wherein the subchamber injection port defined by said mouthpiece includes a plurality of separated ports open to the subchamber and the combustion chamber, one of said plurality of ports being located further away from a cylinder axis passing through the center of a cylinder disposed in the main combustion chamber than the other of said plurality of ports, and said space being open to said one of said plurality of ports.

6. The improvement in a fuel-injected combustion engine as claimed in claim 3, wherein the subchamber injection port defined by said mouthpiece includes a plurality of separated ports open to the subchamber and the combustion chamber, one of said plurality of ports being located further away from a cylinder axis passing through the center of a cylinder disposed in the main combustion chamber than the other of said plurality of ports, and said space being open to said one of said plurality of ports.

7. A mouthpiece of a subchamber type of internal combustion engine, said mouthpiece having an inner peripheral surface defining a port extending therethrough, a space defined therein open at said peripheral surface, a control rod disposed in said space adjacent said port, and an actuator disposed in said space remote from said port with said control rod interposed therebetween, said actuator operatively engaging said control rod and positioning one end of said control rod at the location at which said space is open to said inner peripheral surface when the actuator is subjected to a predetermined temperature, and the actuator projecting said control rod into said port to reduce the cross-sectional area thereof when the actuator is subjected to a temperature higher than said predetermined temperature, said actuator comprising a working substance such as wax or rubber or alcohol that expands and contracts to a significant degree when subjected to temperature changes, and an expansible member comprising an expansible material such as rubber sealing said working substance within said actuator and conformed to receive the other end of said control rod, said other end of said control rod extending in and engaged by said expansible member.

8. A mouthpiece of a subchamber type of internal combustion engine as claimed in claim 7, wherein said one end of said control rod has a rounded outer peripheral surface.

9. A mouthpiece of a subchamber type of internal combustion engine as claimed in claim 7, further comprising a resilient member engaging said actuator at an end thereof opposite said port control rod.

10. A mouthpiece of a subchamber type of internal combustion engine as claimed in claim 7, wherein the port defined by said mouthpiece includes a plurality of separated ports extending therethrough, and said space is open to one of said plurality of ports.

11. A mouthpiece of a subchamber type of internal combustion engine as claimed in claim 8, wherein the port defined by said mouthpiece includes a plurality of separated ports extending therethrough, and said space is open to one of said plurality of ports.

12. A mouthpiece of a subchamber type of internal combustion engine as claimed in claim 9, wherein the port defined by said mouthpiece includes a plurality of separated ports extending therethrough, and said space is open to one of said plurality of ports.

* * * * *